United States Patent Office 2,743,185
Patented Apr. 24, 1956

2,743,185

SALMON EGG CURING

Fred Tereski, Galvin, Wash., assignor of one-half to Earl O. Rucker, Portland, Oreg.

No Drawing. Application December 16, 1952,
Serial No. 326,363

2 Claims. (Cl. 99—3)

This invention relates to a method of curing salmon eggs to produce fish bait.

Cured salmon eggs have been commonly used as fish bait but the methods employed have been time-consuming and produce inferior bait in which the natural flavor has been killed, the consistency is rubbery, the appearance is dull and the bait spoils shortly after it is exposed to the air.

It is the principal object of the present invention to provide a simple and rapid method of curing salmon eggs to produce bait having a high degree of its natural flavor, that has a pasty consistency, is bright in color and has a lustrous appearance and will not spoil even though exposed to the air for long periods of time.

The foregoing objects and others ancillary thereto are preferably accomplished in accordance with the present invention by a method of curing salmon eggs exclusively by heat treatment in salt solutions of different concentrations depending upon the oil content, consistency and color desired for the particular use.

The salmon eggs employed in the curing process according to the present invention may be matured eggs that have been naturally delivered from the roe or they may be immature eggs still encased within the roe. In the latter event, it is necessary to artificially mature the eggs and free them from the roe which is in the nature of a honeycombed membranous sac. The invention comprises a method of maturing these immature eggs as well as curing the eggs, whether naturally or artificially matured.

In the event that the eggs are still contained in the roe, about twenty pounds of the egg containing roes are placed in about one gallon of water. This may be tap water at normal temperatures, usually 65 to 75° F. To this water is added about one cup of salt, preferably pure salt which is commercially known as 100% salt.

The salt is stirred in the water to expedite dissolution and distribution, and this solution containing the roes is then heated. Stirring is continued during the heating so that all of the eggs in the roes are heated as uniformly as possible. The solution is heated at a rate such as to raise the temperature of the solution to about 200° F. within approximately seventeen minutes.

After this time and at this temperature, the salt and the heat have matured the eggs sufficiently so that they readily separate from the roe. The heating is therefore stopped and the solution is quickly stirred or agitated to shake and dislodge the eggs from the roes. When the eggs are completely separated from the roes, the roes are then removed and the eggs left in the solution, ready to proceed with the curing process.

In the event that the eggs have been matured and separated from the roes by nature, the foregoing artificial maturing process is not necessary. In this case, about twenty pounds of the eggs, without the roes, are placed in about a gallon of water to start the curing process instead of the artificially cured eggs in the mild salt solution. In either case, the curing process is the same.

To cure the eggs, a quantity of salt is added to the liquid and stirred to evenly distribute and dissolve the salt. This solution is then subjected to heat while the agitation is continued. The quantity of salt that is added, and to some degree the heat treatment, is varied according to the type and color of egg desired. In any event, the best and strongest salt obtainable, such as the aforementioned 100% salt, is employed at all times.

There are three principal types of cured eggs that are used for bait under respectively different conditions. These types are the wet pack, the damp pack and the dry pack. The wet pack comprises a light orange pink colored almost white egg containing considerable oil and of a heavy oily paste consistency. This type of bait is principally used in fast water because the egg will "milk" or disperse the oil and thereby lure the fish. The dry pack, on the other hand, has relatively little oil content and is used in still deep water, such as in lake fishing. This egg is somewhat darker having a coral-red color, and the interior of the egg is of a sticky paste consistency. The damp pack egg is intermediate the eggs of the wet and dry packs, it has a light paste consistency, is a coral-orange in color, has some oil content and is used in intermediate waters.

To cure the eggs for a wet pack, two cups of salt are added to the liquid containing the eggs, that is the water containing the naturally matured eggs or the mild salt solution containing the artificially matured eggs. As previously stated, the liquid is continuously stirred as the salt is added so as to form a uniform solution and/or dispersion. This solution is then heated gradually to the boiling point as the stirring is continued and then maintained at boiling for two minutes.

After boiling for two minutes, the eggs should be at the proper consistency that will enable them to be retained on a hook. The eggs may be tested by sticking them with a needle or pin. If the consistency is proper, the heat is stopped and the eggs are separated from the solution and immediately packed in a jar or other container. By this process, the eggs will be light colored and have a high oil content. Some of the oil seeps from the eggs within five to seven days after canning and causes the "wet" pack.

To produce a damp pack, the steps are exactly the same as the foregoing "wet" process, except that three cups of salt are added to the egg containing liquid instead of the two cups employed for the wet pack. After the salt is added, the solution is stirred, heated gradually to boiling and boiled for two minutes, the eggs are separated and then canned.

To produce a dry pack, the steps are substantially the same, except that four and one-half cups of salt are added to the egg containing liquid and the liquid is not boiled. After the salt is added, the solution is gradually heated, and continuously stirred, up to the boiling point and then maintained just below the boiling point until the eggs are the proper consistency, whereupon the eggs are separated from the liquid and canned immediately.

These processes produce eggs of the selectively desired color and consistency that are lustrous in appearance and natural in flavor so that they are palatable to the fish. These eggs do not spoil after the containers are opened but remain fresh for an indefinite period.

Although certain specific embodiments of the invention have been described, it is obvious that modifications thereof may be possible. The invention, therefore, is not to be restricted except insofar as is necessitated by the spirit of the appended claims.

What I claim as new is:

1. The method of producing fish bait from salmon eggs, which comprises depositing the eggs in water at the rate of about twenty pounds of eggs to one gallon of water, adding salt to the water at the rate of about two to three cups of salt to one gallon of water, agitating the water to produce a pure salt solution free of sugar, coloring or preservatives, heating the solution gradually to the boiling point while continuously agitating the solution, boiling the solution for about two minutes, separating the eggs from the solution and immediately canning the eggs.

2. The method of producing fish bait from salmon eggs, which comprises depositing egg containing roes in water at the rate of about twenty pounds of roe to one gallon of water, adding salt to the water at the rate of about one cup of salt to one gallon of water, heating the water for about seventeen minutes and at the rate to reach a temperature of about 200° F. at the end of the seventeen minutes, continuously agitating the water to distribute the salt and uniformly heat the eggs within the roes, removing the heat, separating the eggs from the roes, removing the roes from the water with the eggs left in the water, adding salt to the water at the rate of from two to three cups of salt to one gallon of water, agitating the water to produce a salt solution, heating the solution gradually to the boiling point while continuously agitating the solution, boiling the solution for about two minutes, separating the eggs from the solution and immediately canning the eggs.

References Cited in the file of this patent
UNITED STATES PATENTS 1,703,324   Sellen _____ Feb. 26, 1919

OTHER REFERENCES

Fishery Leaflet 28, U. S. Dept. Int., Fish and Wildlife Service, September 1946, pages 17–18.